United States Patent
Ren et al.

(10) Patent No.: US 10,871,609 B2
(45) Date of Patent: Dec. 22, 2020

(54) BACKLIGHT MODULE AND DISPLAY DEVICE

(71) Applicants: Beijing BOE Display Technology Co., Ltd., Beijing (CN); BOE Technology Group Co., Ltd., Beijing (CN)

(72) Inventors: Jinyu Ren, Beijing (CN); Yongzhi Song, Beijing (CN); Jun Ma, Beijing (CN); Sha Feng, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 22 days.

(21) Appl. No.: 16/190,483

(22) Filed: Nov. 14, 2018

(65) Prior Publication Data

US 2019/0235156 A1    Aug. 1, 2019

(30) Foreign Application Priority Data

Jan. 30, 2018    (CN) .......................... 2018 1 0088271

(51) Int. Cl.
G09G 3/36        (2006.01)
F21V 8/00        (2006.01)

(52) U.S. Cl.
CPC ........... *G02B 6/0088* (2013.01); *G02B 6/008* (2013.01); *G02B 6/0031* (2013.01); *G02B 6/0045* (2013.01); *G02B 6/0055* (2013.01)

(58) Field of Classification Search
CPC ................... F21S 19/005; F21S 19/00; G02F 2001/133618
See application file for complete search history.

(56) References Cited

U.S. PATENT DOCUMENTS

| | | | | |
|---|---|---|---|---|
| 4,539,625 A | * | 9/1985 | Bornstein | F21S 11/00 362/145 |
| 5,548,490 A | * | 8/1996 | Smith | F21S 11/00 136/259 |
| 6,273,577 B1 | * | 8/2001 | Goto | F21S 19/00 349/65 |
| 6,369,866 B1 | * | 4/2002 | Rai | G02B 6/003 349/61 |
| 6,929,392 B2 | * | 8/2005 | Kim | G02B 6/0018 362/561 |

(Continued)

FOREIGN PATENT DOCUMENTS

| | | |
|---|---|---|
| CN | 1940666 A | 4/2007 |
| CN | 101782698 A | 7/2010 |

(Continued)

OTHER PUBLICATIONS

First Office Action, including Search Report, for Chinese Patent Application No. 201810088271.5, dated May 11, 2020, 20 pages.

*Primary Examiner* — Andrew J Coughlin
(74) *Attorney, Agent, or Firm* — Westman, Champlin & Koehler, P.A.

(57) ABSTRACT

A backlight module and a display device are provided. The backlight module includes a light guide plate and a light collection component. The light collection component includes a light capturing device, the light capturing device has a connection opening, and the connection opening of the light capturing device is configured to introduce the captured light into the light guide plate.

9 Claims, 5 Drawing Sheets

(56) References Cited

U.S. PATENT DOCUMENTS

| | | | | |
|---|---|---|---|---|
| 7,213,955 | B1* | 5/2007 | Ladouceur | G02B 6/0028 362/557 |
| 7,369,735 | B2* | 5/2008 | Nyhart, Jr. | G02B 6/26 385/131 |
| 8,368,844 | B2 | 2/2013 | Ishikawa et al. | |
| 9,477,033 | B2* | 10/2016 | Raymond | H01L 31/0547 |
| 9,690,032 | B1* | 6/2017 | Nichol | G02B 6/0045 |
| 10,012,867 | B2* | 7/2018 | Chang | G02F 1/133553 |
| 2003/0201702 | A1* | 10/2003 | Kim | G02B 6/0018 313/110 |
| 2007/0146624 | A1* | 6/2007 | Duston | F24S 23/00 349/193 |
| 2011/0170036 | A1 | 7/2011 | Ishikawa et al. | |
| 2013/0093806 | A1* | 4/2013 | Miura | G02B 6/0028 345/690 |
| 2014/0146268 | A1* | 5/2014 | Li | G02B 6/04 349/58 |
| 2014/0268331 | A1* | 9/2014 | Polcyn | G02B 5/3066 359/485.02 |
| 2014/0360578 | A1* | 12/2014 | Nichol | F24S 50/20 136/259 |
| 2016/0291234 | A1* | 10/2016 | Qiu | G02B 6/0011 |
| 2018/0120636 | A1* | 5/2018 | Chang | G02F 1/133524 |
| 2019/0086601 | A1 | 3/2019 | Zhang et al. | |
| 2019/0235156 | A1* | 8/2019 | Ren | G02B 6/0031 |

FOREIGN PATENT DOCUMENTS

| | | |
|---|---|---|
| CN | 102155677 A | 8/2011 |
| CN | 102494297 A | 6/2012 |
| CN | 102966910 A | 3/2013 |
| CN | 107561630 A | 1/2018 |
| JP | S6391629 A | 4/1988 |

* cited by examiner

BACKLIGHT MODULE AND DISPLAY DEVICE

CROSS-REFERENCE TO RELATED APPLICATION

The present application claims a priority of the Chinese patent application No. 201810088271.5 filed on Jan. 30, 2018, which is incorporated herein by reference in its entirety.

TECHNICAL FIELD

The present disclosure relates to the field of display technologies, and in particular, to a backlight module and a display device.

BACKGROUND

At present, the mainstream display on the market is a liquid crystal display, which is a flat and ultra-thin display device, has a good display image and is widely welcomed by users.

A common liquid crystal display includes a backlight module and a display panel, and the display panel displays an image using backlight provided by the backlight module. However, the transmittance of a general display panel is less than 10%, such that when the backlight provided by the backlight module is used for image display on the display panel, the luminance of the displayed image is relatively low. In order to overcome this problem, the backlight module uses a high-power light source, such that the backlight module provides backlight with high luminance to the display panel, thereby improving image luminance, which results in relatively high power consumption of the backlight module.

SUMMARY

A backlight module, including a light guide plate and a light collection component, where the light collection component includes a light capturing device, the light capturing device includes a connection opening, and the connection opening of the light capturing device is configured to introduce captured light into the light guide plate.

Optionally, the light capturing device includes a bottom reflection layer, a top transmission layer and an end reflection layer, a light exporting cavity is arranged between the top transmission layer and the bottom reflection layer, the connection opening is arranged at an end of the light exporting cavity, and the end reflection layer is arranged at an end of the light exporting cavity opposite to the connection opening.

Optionally, the top transmission layer includes a top optically thinner medium layer and a top optically denser medium layer stacked, the top optically denser medium layer is arranged between the light exporting cavity and the top optically thinner medium layer, and the bottom reflection layer is parallel to the top optically denser medium layer.

Optionally, the light capturing device further includes a bottom transmission layer in contact with the light exporting cavity, and the bottom transmission layer is arranged between the top transmission layer and the bottom reflection layer.

Optionally, the bottom transmission layer is parallel to the top transmission layer, an angle between the bottom reflection layer and the bottom transmission layer is equal to a critical incident angle $\theta$, and the critical incident angle $\theta$ is a minimum incident angle of light a meeting a capturing condition and emitted to the top transmission layer from the outside, the bottom reflection layer is configured to reflect light that does not meet the capturing condition into light meeting the capturing condition, to enable the light meeting the capturing condition to be captured by the light capturing device.

Optionally, the top transmission layer includes a top optically thinner medium layer and a top optically denser medium layer, the bottom transmission layer includes a bottom optically thinner medium layer and a bottom optically denser medium layer, the light exporting cavity is arranged between the top optically denser medium layer and the bottom optically denser medium layer, the top optically denser medium layer and the bottom optically denser medium layer are both in contact with the light exporting cavity, the top optically thinner medium layer is in contact with a surface of the top optically denser medium layer away from the light exporting cavity, and the bottom optically thinner medium layer is in contact with a surface of the bottom optically denser medium layer away from the light exporting cavity, and the bottom reflection layer is opposite to a surface of the bottom optically denser medium layer away from the bottom optically denser medium layer.

Optionally, the light collection component further includes a light conducting device, a light entrance of the light conducting device is connected to the connection opening, and a light exit of the light conducting device is connected to a light incident surface of the light guide plate.

Optionally, an area of the light entrance of the light conducting device is greater than or equal to an area of the connection opening.

Optionally, the bottom reflection layer is configured to reflect light entering the light exporting cavity to a surface of the top transmission layer in contact with the light exporting cavity, the top transmission layer is configured to totally reflect light meeting a capturing condition on the surface of the top transmission layer in contact with the light exporting cavity to capture the light meeting the capturing condition.

Optionally, the bottom transmission layer is configured to totally reflect light meeting the capturing condition on a surface of the bottom transmission layer in contact with the light exporting cavity, to reflect the light meeting the capturing condition to the surface of the top transmission layer in contact with the light exporting cavity and totally reflected the light on the surface of the top transmission layer in contact with the light exporting cavity, to capture the light meeting the capturing condition, and the bottom reflection layer is configured to reflect light that does not meet the capturing condition into light meeting the capturing condition and reflect the light meeting the capturing condition to the bottom transmission layer to enable the light to enter into the light exporting cavity.

Optionally, the light conducting device is configured to introduce the captured light into the light guide plate, to diffuse the captured light through the light guide plate.

A display device is further provided in the present disclosure, including a backlight module and a display panel, where the backlight module includes a light guide plate and a light collection component, the light collection component includes a light capturing device, the light capturing device includes a connection opening, and the connection opening of the light capturing device is configured to introduce the captured light into the light guide plate, the light collection component of the backlight module is arranged at a periphery of the display panel, and a surface of the light capturing device receiving light and a display surface of the display panel are on the same plane.

BRIEF DESCRIPTION OF THE DRAWINGS

The drawings described herein are intended to provide a further understanding of the present disclosure, and form a part of the present disclosure. The embodiments of the present disclosure and the description thereof are intended to explain the present disclosure and do not constitute an undue limitation of the present disclosure. In the drawings.

DETAILED DESCRIPTION OF THE EMBODIMENTS

The technical solutions in some embodiments of the present disclosure will be clearly and completely described below in conjunction with the accompanying drawings in some embodiments of the present disclosure. It is apparent that the described embodiments are only a part of the embodiments of the present disclosure, rather than all of them. All other embodiments obtained by a person of ordinary skill in the art based on the embodiments of the present disclosure without creative labor fall within the scope of protection of the present disclosure.

Referring to FIG. 1 to FIG. 4, a backlight module provided in some embodiments of the present disclosure includes a light collection component 1 and a light guide plate 2. The light collection component 1 includes a light capturing device 11, and the light capturing device 11 has a connection opening 100. The connection opening 100 of the light capturing device 11 is configured to introduce the captured light into the light guide plate.

In some embodiments of the present disclosure, the light capturing device captures light, and the captured light is introduced into the light guide plate.

According to the backlight module in some embodiments of the present disclosure, the light capturing device 11 has a connection opening 100, and the connection opening of the light capturing device 11 is configured to introduce the captured light into the light guide plate 2, such that when the backlight module 1 provides the backlight to the display panel 2, the light capturing device 11 may be used to capture light, and the captured light is introduced into the light guide plate 2 through the connection opening 100 as supplemental backlight to compensate for light loss caused by a low transmittance of the display panel 5, thereby increasing the luminance of images displayed by the display device, without increasing image luminance by increasing the power of the light source in the backlight module. Therefore, the luminance of the display image may be increased with low power consumption.

It should be noted that, as shown in FIG. 1 to FIG. 4, the backlight module provided by some embodiments of the present disclosure further includes some common devices, such as a reflection sheet 3 arranged at the bottom of the light guide plate 2, and a diffusing plate 4 arranged on a light emitting surface of the light guide plate 2. The reflection sheet 3 may reflect light leaked from the bottom of the light guiding plate 2 back to the light guiding plate 2 to reduce the light leakage, and the diffusing plate 4 may diffuse light guided by the light guiding plate 2 to ensure the evenness of backlight entering the display panel 5.

In view of the position of the light capturing device, as shown in FIG. 1 to FIG. 4, the light collection component 1 in some embodiments of the present disclosure further includes a light conducting device 12, the light entrance of the light conducting device 12 is connected to the connection opening 100, and the light exit of the light conducting device 12 is connected to the light incident surface of the light guide plate 2.

In some embodiments of the present disclosure, the light capturing device 11 transmits the light to the light conducting device 12 through the connection opening 100. The light conducting device 12 introduces the light into the light guide plate 2, such that the light may be diffused at the light guide plate 2, thereby realizing the light emission of the backlight module. Since the light conducting device 12 may introduce the captured light into the light guide plate 2, the position of the light capturing device 11 may be relatively freely arranged. The shape of the light conducting device 12 may be designed according to the relative positional relationship between the connection opening 100 of the light capturing device 11 and the light incident surface of the light guide plate 2.

When the connection opening 100 of the light capturing device 11 is opposite to the light incident surface of the light guide plate 2, the shape of the light conducting device 12 is linear; when the connection opening 100 of the light capturing device 11 is not opposite to the light incident surface of the light guide plate 2, the shape of the light conducting device 12 is irregular, such as an arc structure as shown in FIG. 1 to FIG. 4. In terms of the arrangement of the light capturing device 11, as long as the shape of the light conducting device 12 is adaptively designed, the position of the light capturing device may be highly flexibly arranged, which is not limited by the position of the light incident surface of the light guide plate 2.

In order to make full use of the space, in the backlight module provided in some embodiments of the present disclosure, the light capturing device 11 may be arranged in a gap region between the display panel 5 and the bezel, or may be arranged on the upper portion of the bezel and pass through the gap region between the display panel 5 and the bezel via the light conducting device 12, such that the light exit of the light conducting device 12 is opposite to the light incident surface of the light guide plate 2. The light conducting device 12 may be a common light conducting device 12 comprising a total reflection function, such as an optical fiber. An optical fiber has a linear structure and the shape thereof may vary with space, which makes the arrangement of the position of the light capturing device 11 more abundant.

In order to avoid the light leakage which occurs when the light captured by the light capturing device 11 enters the light conducting device 12 via the connection opening 100, the area of the light entrance of the light conducting device 12 in some embodiments of the present disclosure is greater than or equal to the area of the connection opening 100, such that the light conducting device collects the light captured by the light capturing device 11 as much as possible and transmits the light.

Specifically, as shown in FIG. 1 to FIG. 4, in some embodiments of the present disclosure, the light capturing device 11 includes a top transmission layer 111 and a bottom reflection layer 112. A light exporting cavity 10 is arranged between the top transmission layer 111 and the bottom reflection layer 112. One end of the light exporting cavity 10 has a connection opening 100, and an end reflection layer 114 is arranged at the end of the light exporting cavity 10 away from the connection opening 200. When light passes from the outside through the top transmission layer 111 and enters into the light exporting cavity 10, a part of the light is reflected by the bottom reflection layer 112 and then emitted from the top transmission layer 111 to the outside, and the other part of the light is introduced into the light guide plate 2 through the light exporting cavity 10. The end reflection layer 114 is arranged at one end of the light exporting cavity 10 away from the connection opening 200, such that when light is directed toward the end reflection layer 114, the end reflection layer 114 may reflect the light toward the connection opening 100, thereby preventing the light from leaking out from the light exporting cavity 10, and improving light utilization efficiency.

For example, the structure of the light capturing device 11 in some embodiments of the present disclosure is various, and is exemplified below with reference to the drawings.

Figure 1:
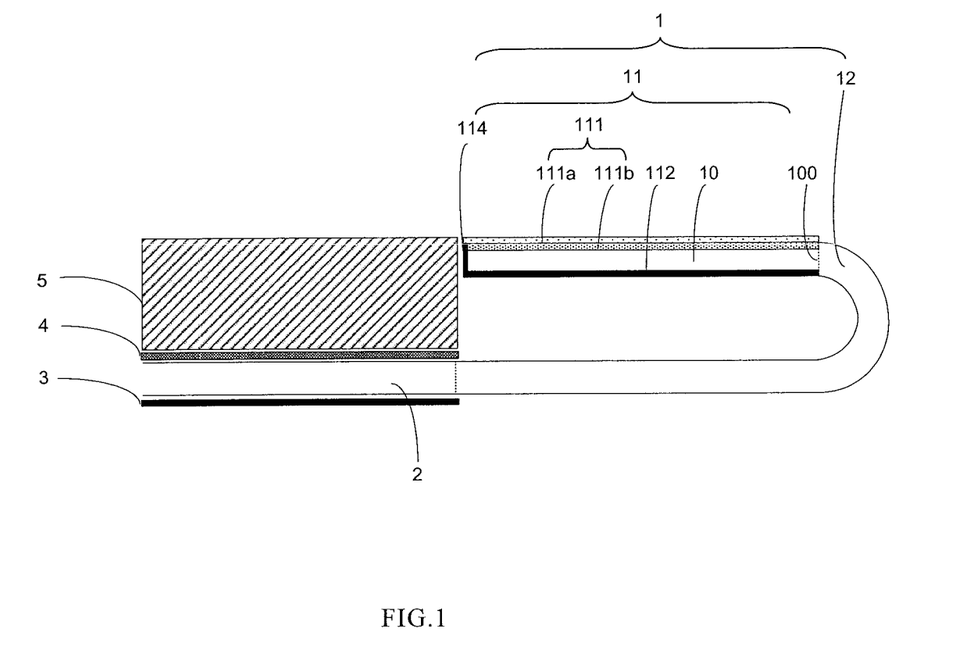
FIG. 1 is a schematic view I of a backlight module applied to a display device in some embodiments of the present disclosure.
Figure 2:
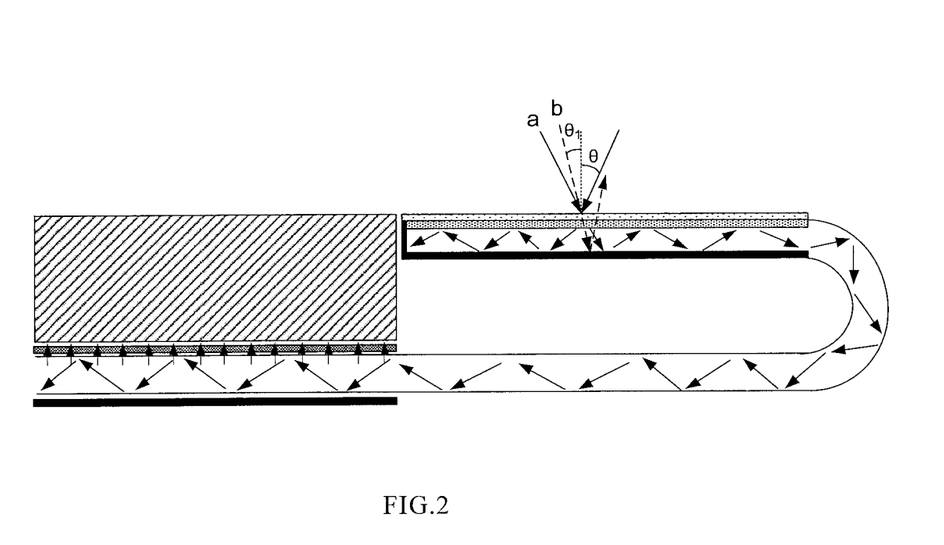
FIG. 2 is a light conducting path view I of a backlight module applied to a display device in some embodiments of the present disclosure.

In some embodiments of the present disclosure, as shown in FIG. 1 and FIG. 2, the light capturing device includes a top transmission layer 111 and a bottom reflection layer 112 arranged in parallel. A light exporting cavity 10 is arranged between the top transmission layer 111 and the bottom reflection layer 112, and a connection opening 100 is arranged at one end of the light exporting cavity 10.

Among the light entering the light exporting cavity 10, the light a meeting a capturing condition is totally reflected when emitted from the light exporting cavity 10 toward the top transmission layer 111, and the light b not meeting the capturing condition is reflected by the bottom reflection layer 112 and directed to the outside from the top transmission layer 111.

FIG. 2 shows an optical path of light entering the exporting cavity. It may be seen from FIG. 1 and FIG. 7 that among the light entering the exporting cavity, the incident angle of light meeting the capturing condition and emitted to the top transmission layer 111 from the outside is greater than or equal to a critical incident angle θ which is a minimum incident angle of the light a meeting the capturing condition and emitted to a first light incident surface M1 from the outside. The light a meeting the capturing condition is reflected by the bottom reflection layer 112 and directed from the light exporting cavity 10 to the top transmission layer 111 and then the light is totally reflected. After multiple times of reflection of the light a between the bottom reflection layer 112 and the top transmission layer 111, the light a meeting the capturing condition enters the light conducting device 12 from the light entrance of the light conducting device 1, and is conducted within the light conducting device 12, finally is emitted out through the light exit of the light conducting device 12, and enters the light guide plate 2 from the light incident surface of the light guide plate 2. The incident angle of the light not meeting the capturing condition and emitted to the top transmission layer 111 from the outside is smaller than the critical incident angle θ. The light a meeting the capturing condition is reflected by the bottom reflection layer 112, and then is directed from the light exporting cavity 10 toward the top transmission layer 111, and is emitted to the outside through the top transmission layer 111 (ignoring reflection and refraction at the top transmission layer 111).

It should be noted that, when an appropriate material is selected for the top transmission layer 111, only one layer is needed to achieve total reflection. Of course, as shown in FIG. 1, the top transmission layer 111 may also include a top optically thinner medium layer 111a and a top optically denser medium layer 111b. One surface of the top optically denser medium layer 111b is in contact with the light exporting cavity 10, and the other surface of the top optically denser medium 111b is in contact with the top optically thinner medium layer 111a.

When the top transmission layer 111 and the bottom reflection layer 112 are both flat structures, as the light exporting cavity is arranged between the top transmission layer 111 and the bottom reflection layer 112, such that when one end of the light exporting cavity 10 serves as the connection opening 100, the end of the light exporting cavity 10 away from the connection opening 100 has an opening, and then the light entering the light exporting cavity 10 leaks from the opening at the end of the light exporting cavity 10 away from the connection opening 100. In view of this, the end reflection layer 114 in some embodiments of the present disclosure is connected to a lateral edge of the bottom reflection layer 112 and a lateral edge of the top transmission layer 111, such that when the light enters the light exporting cavity 10 and is directed toward the end reflection layer 114, the end reflection layer 114 is capable of reflecting the light toward the connection opening 100, thereby preventing the light from leaking out from the light exporting cavity 10 and improving light utilization efficiency.

Figure 3:
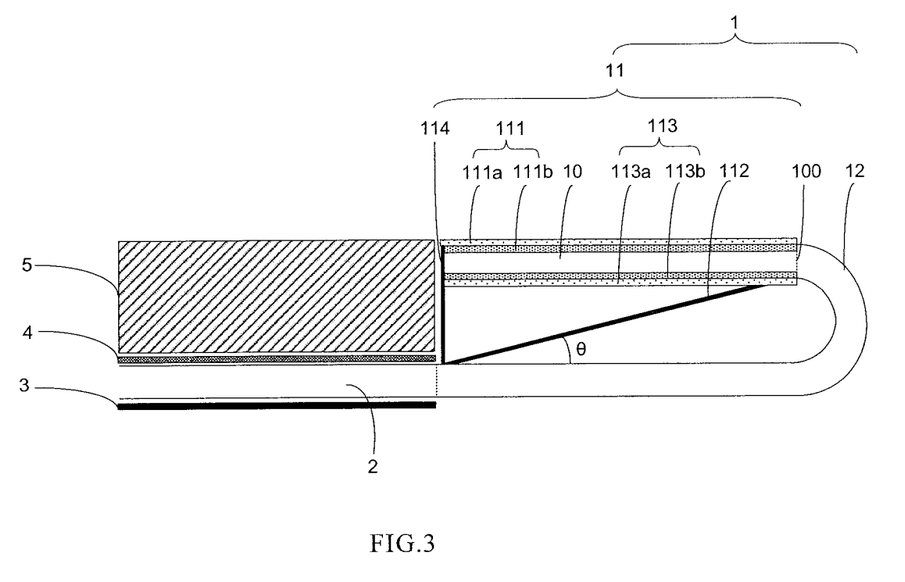
FIG. 3 is a schematic view II of a backlight module applied to a display device in some embodiments of the present disclosure.
Figure 4:
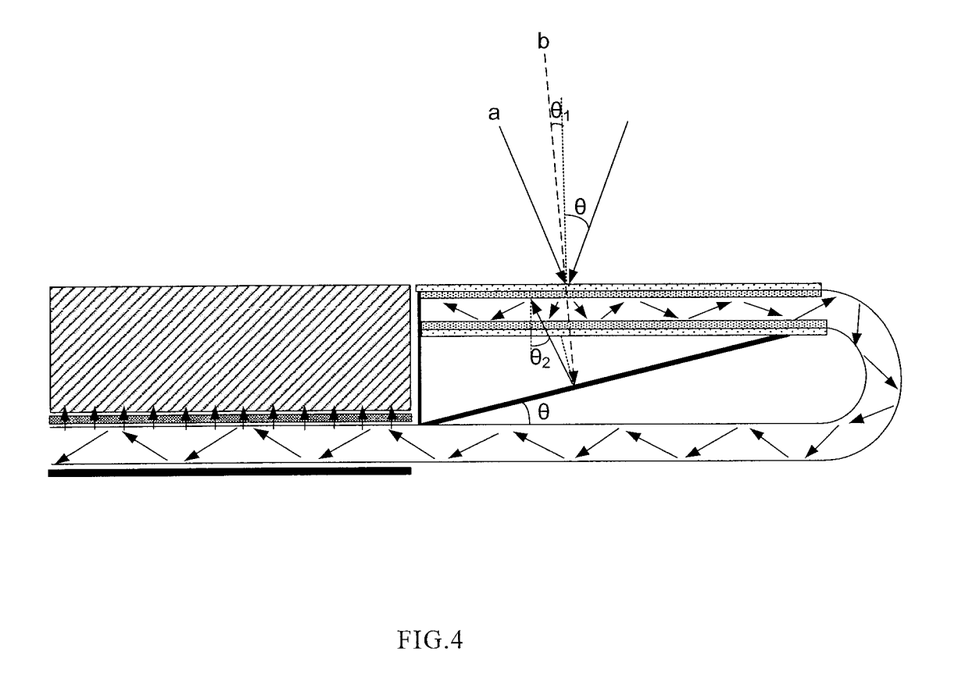
FIG. 4 is a light conducting path view II of a backlight module applied to a display device in some embodiments of the present disclosure.

As shown in FIG. 3 and FIG. 4, in some embodiments of the present disclosure, the light capturing device includes a bottom reflection layer 112 and a transmission structure with the connection opening 100. The light exporting cavity 10 is arranged within the transmission structure, and the connection opening 100 is arranged at one end of the light exporting cavity 10. The bottom reflection layer 112 is configured to reflect the light b not meeting the capturing condition into light meeting the capturing condition, so as to enable the light capturing device to capture the light meeting the capturing condition.

Among the light entering the light exporting cavity 10, the light a meeting the capturing condition is totally reflected after being directed from the light exporting cavity 10 toward the transmission structure, while the light b not meeting the capturing condition is directed through the transmission structure toward the bottom reflection layer 112, so as to reflect the light b passed through these transmission mechanisms and not meeting the capturing condition by the bottom reflection layer 112 into the light meeting the capturing condition, to enable the light to be emitted toward the transmission structure again and captured by the transmission structure, thereby improving light utilization efficiency and reducing the light leakage.

Figure 5:
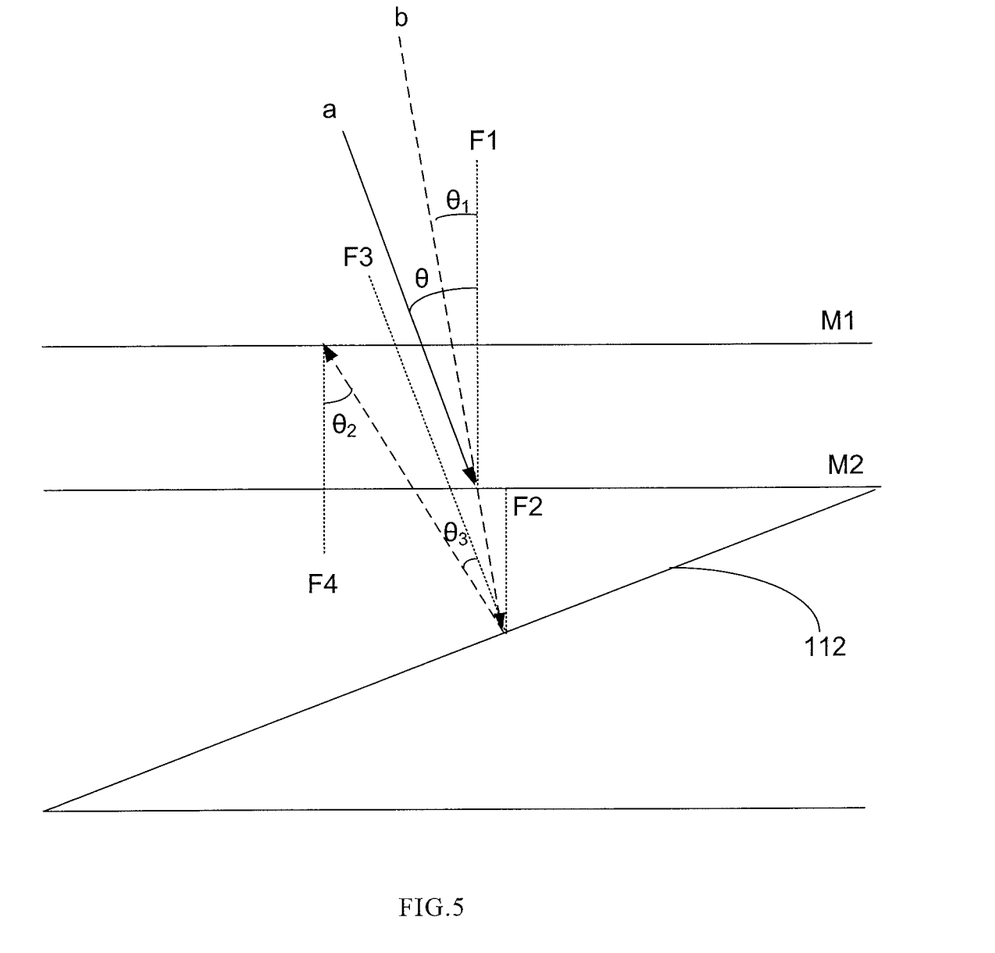
FIG. 5 is a schematic view of a light propagation of a light capturing device of FIG. 3.

For example, as shown in FIG. 3 to FIG. 5, the surface of the transmission structure away from the light exporting cavity 10 has a first light incident surface M1 and a second light incident surface M2. The first light incident surface M1 is opposite to a light source (e.g., the external light serves as the light source), and the reflection surface of the bottom reflection layer 112 is opposite to the second light incident surface M2, such that the second light incident surface may be configured to receive the light reflected by the bottom reflection layer and meeting the capturing condition. The way how the light capturing device captures the light will be described below.

As shown in FIG. 3 to FIG. 5, the first light incident surface M1 and the second light incident surface M2 are parallel. When the second light incident surface M2 is configured to receive the light reflected by the bottom reflection layer 112 and meeting the capturing condition, the angle between the surface of the bottom reflection layer 112 and the second light incident surface M2 is equal to the critical incident angle $\theta$.

The incident angle $\theta 1$ of the light b not meeting the capturing condition and emitted from the outside to the first light incident surface M1 is smaller than the critical incident angle $\theta$, and the incident angle $\theta 2$ of the light reflected by the bottom reflection layer 112 and meeting the capturing condition toward the second light incident surface M2 is greater than the critical incident angle $\theta$, $\theta_2=2\theta-\theta_1$. The critical incident angle $\theta$ is the minimum incident angle of the light a meeting the capturing condition and emitted from the outside to the first light incident surface M1.

The derivation process of $\theta_2=2\theta-\theta_1$ will be described below with reference to FIG. 5. For the case where light passes through the first light incident surface M1 and/or the second light incident surface M2, the refraction and reflection occurring when the light passes through the first light incident surface M1 and/or the second light incident surface M2 is ignored during the derivation process, that is, the light merely passes through the first light incident surface M1 and/or the second light incident surface M2 and the direction of the light is not changed, which enables the $\theta_2$ shown in FIG. 5 to express the incident angle $\theta 2$ of the light meeting the capturing condition and reflected by the bottom reflection layer 112 toward the second light incident surface M2. The incident angle of the light b that does not meet the capturing condition and directed to the bottom reflection layer 112 is defined as $\theta_3$.

As shown in FIG. 5, a first normal line F1 and a second normal line F2 are both the normal lines of the second light incident surface M2, a third normal line F3 is the normal line of the bottom reflection layer, and a fourth normal line F4 is the normal line of the first light incident surface. As the first light incident surface M1 and the second light incident surface M2 are parallel, $\theta_2=2\theta_3+\theta_1$, and since $\theta=\theta_3+\theta_1$, $\theta_2=2(\theta-\theta_1)+\theta_1=\theta+(\theta-\theta_1)$, it is known that $\theta>\theta_1$, that is, as $\theta-\theta_1>0$, $\theta_2=2\theta-\theta_1>\theta$.

It may be seen from the above that, when the angle between the surface of the bottom reflection layer 112 and the second light incident surface M2 is equal to the critical incident angle $\theta$, the bottom reflection layer 112 may reflect the light that does not meet the capturing condition into the light meeting the capturing condition and direct the light from the second light incident surface M2 into the light exporting cavity 10.

For example, FIG. 4 shows the specific structure of the transmission structure in the second light capturing device, which will be described in detail below.

As shown in FIG. 4, the transmission structure includes a top transmission layer 111 and a bottom transmission layer 113 arranged in parallel, a light exporting cavity 10 is arranged between the top transmission layer 111 and the bottom transmission layer 113, and the top transmission layer 111 and the bottom transmission layer 113 are both in contact with the light exporting cavity 10.

The surface of the bottom transmission layer 113 in contact with the light exporting cavity 10 is opposite to the top transmission layer 111, and the surface of the bottom transmission layer 113 away from the light exporting cavity 10 is opposed to the bottom reflection layer 113. At the time, the surface of the top transmission layer 111 in contact with the outside is equivalent to the plane of the first light incident surface M1, and the surface of the bottom transmission layer 113 in contact with the outside is equivalent to the plane of the second light incident surface M2. That is, the angle between the surface of the bottom reflection layer 112 in contact with the outside and the surface of the bottom transmission layer 113 in contact with the outside is equal to the critical incident angle $\theta$.

Among the light entering the light exporting cavity 10, the light a meeting the capturing condition is totally reflected when directed from the light exporting cavity 10 toward the bottom transmission layer 113 and the top transmission layer 111, and the light b not meeting the capturing condition is directed from the bottom transmission layer 113 to the bottom reflection layer 112 to be further reflected by the bottom reflection layer 112.

Further, as shown in FIG. 3, in some embodiments of the present disclosure, in the case that appropriate materials are selected for the top transmission layer 111 and the bottom transmission layer 113, the transmission structure may be arranged without improving the materials of the top transmission layer 111 and the bottom transmission layer 113. Of course, as shown in FIG. 4, in some embodiments of the present disclosure, the top transmission layer 111 may also include a top optically thinner medium layer 111a and a top optically denser medium layer 111b arranged in a stacked manner, and the bottom transmission layer 113 may also include a bottom optically thinner medium layer 113a and a bottom optically denser medium layer 113b arranged in a stacked manner. The light exporting cavity 10 is arranged between the top optically denser medium layer 111b and the bottom optically denser medium layer 113b, the top optically denser medium layer 111b and the bottom optically denser medium layer 113b are both in contact with the light exporting cavity 10, the top optically thinner medium layer 111a is in contact with the surface of the top optically denser medium layer 111b away from the light exporting cavity 10, the bottom optically thinner medium layer 113a is in contact with the surface of the bottom optically denser medium layer 113b away from the light exporting cavity 10, and the bottom reflection layer 112 is opposite to the surface of the bottom optically thinner medium layer 113a away from the bottom optically denser medium layer 113b.

As shown in FIG. 3 and FIG. 4, in some embodiments of the present disclosure, the end reflection layer 114 arranged at the light exporting cavity 10 away from the connection opening should completely cover the end of the light exporting cavity 10 away from the connection opening, thereby enabling the light within the light exporting cavity 10 and directed to the end reflection layer 114 to be reflected toward the connection opening, thereby improving light utilization efficiency.

For example, when the top transmission layer 111 and the bottom transmission layer 113 both have a flat plate structure, as the light exporting cavity is arranged between the top transmission layer and the bottom transmission layer 113, such that one end of the light exporting cavity 10 serves as the connection opening 100. Because the end reflection layer 114 is arranged at the end of the light exporting cavity 10 away from the connection opening 100, after the light enters the light exporting cavity 10 and being directed toward the end reflection layer 114, the end reflection layer 114 may reflect the light toward the connection opening 100, thereby preventing light from leaking out from the light exporting cavity 10, and improving light utilization efficiency.

Of course, in order to further avoid the light leakage, the end reflection layer 114 may also be connected to the bottom reflection layer 112. At this time, the end reflection layer 114 is extended to a certain extent to be connected to the bottom reflection layer 112, to construct a more complete light utilization system, which not only enables, after the light b that does not meet the capturing condition is emitted from the light exporting cavity 10 to the outside, the light b that does not meet the capturing condition to be reflected by the bottom reflection layer 112 again into the light exporting cavity 10, but also prevent the light leakage by the extending portion of the third reflection layer, thereby improving light utilization efficiency.

Taking FIG. 4 as an example, the end reflection layer 114 is not only connected to the end of the transmission structure, but also extends downward to connect to the bottom reflection layer 112, such that when the light b that does not meet the capturing condition is emitted out from the transmission structure, the light may be further prevented from leaking out, thereby increasing the light utilization efficiency.

Finally, it should be emphasized that in some embodiments of the present disclosure, when describing the first light capturing device and the second light capturing device, in the case of light transmission, the reflection and refraction of light generated during transmission are ignored, that is, even if the light is transmitted, the direction of propagation of light does not change. In addition, both the bottom reflection layer 112 and the end reflection layer 114 are reflection layers, and the definition thereof is only to distinguish their positions, where the reflection layer arranged at the end of the light exporting cavity 10 away from the connection opening 100 is defined as the end reflection layer 114, and the reflection layer arranged at the bottom of the top transmission layer 111 is defined as the bottom reflection layer 112.

Figure 6:
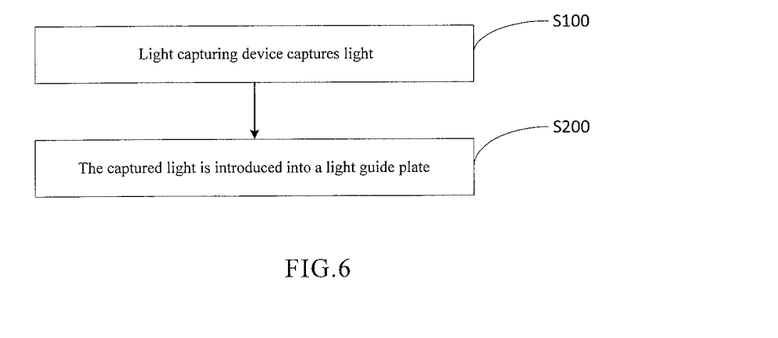
FIG. 6 is a flowchart of a light emitting method for a backlight module in some embodiments of the present disclosure.

As shown in FIG. 1 to FIG. 5 and FIG. 6, the processing of light in the backlight module in some embodiments of the present disclosure includes:

Step S100: capturing light by the light capturing device 11;

Step S200: introducing the captured light into the light guide plate.

Figure 7:
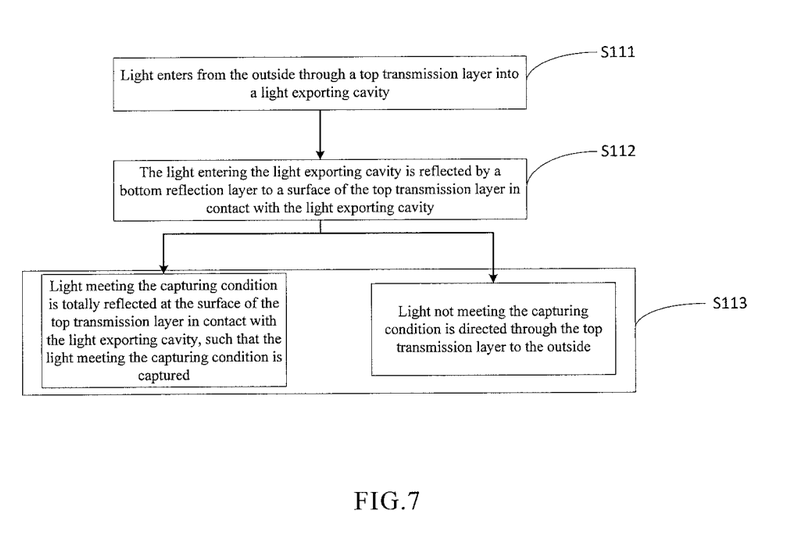
FIG. 7 is a flowchart I of a light capturing method of a light capturing device in some embodiments of the present disclosure.

For example, when the backlight module shown in FIGS. 1 and 2 is used, the light capturing device 11 includes a top transmission layer 111 and a bottom reflection layer 112 arranged in parallel. A light exporting cavity 10 is arranged between the top transmission layer 111 and the bottom reflection layer 112. A connection opening 100 is arranged at one end of the light exporting cavity 10. At this time, as shown in FIG. 1, FIG. 2 and FIG. 7, the light capturing of the light capturing device includes:

Step S111: the light entering from the outside through the top transmission layer 111 into the light exporting cavity;

Step S112: the light entering the light exporting cavity being reflected by the bottom reflection layer 112 to the surface of the top transmission layer 111 in contact with the light exporting cavity 10;

Step S113: the light a meeting the capturing condition being totally reflected at the surface of the top transmission layer 111 in contact with the light exporting cavity 10, to capture the light a meeting the capturing condition; the light b not meeting the capturing condition being directed through the top transmission layer 111 to the outside.

Figure 8:
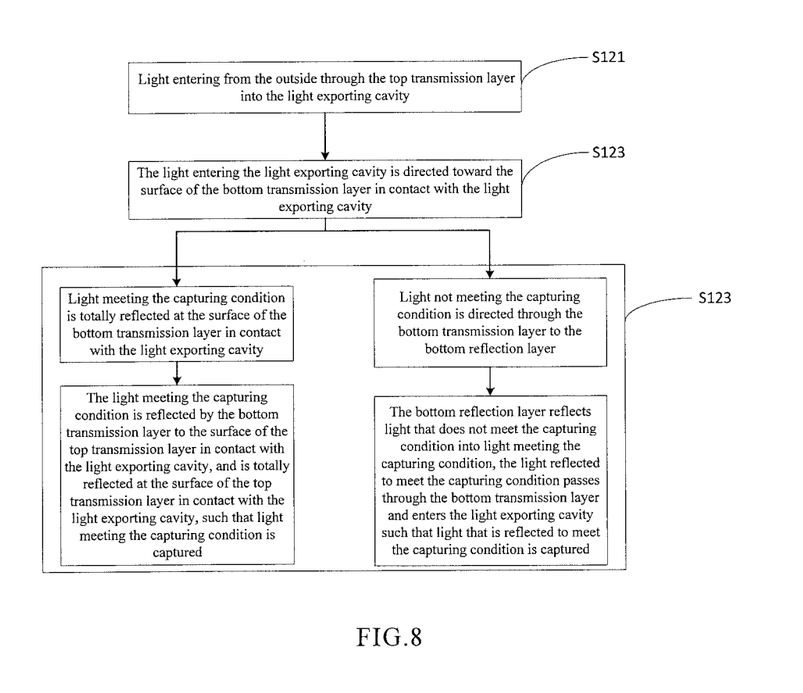
FIG. 8 is a flowchart II of a light capturing method of a light capturing device in some embodiments of the present disclosure.

For example, when the backlight module shown in FIGS. 3 and 4 is used, the light capturing device 11 includes a bottom reflection layer 112, a top transmission layer 111 and a bottom transmission layer 113 arranged in parallel, a bottom transmission layer 113, a top transmission layer 112, and a bottom transmission layer 113 in contact with the light exporting cavity 10. The bottom transmission layer 113 and the top transmission layer 112 are parallel, the surface of the bottom transmission layer 113 in contact with the light exporting cavity 10 is opposite to the top transmission layer 112, and the surface of the bottom transmission layer 113 away from the light exporting cavity 10 is opposite to the bottom reflection layer 112; as shown in FIGS. 3, 4 and 8, the light capturing of the light capturing device includes:

Step S121: light entering from the outside through the top transmission layer 111 into the light exporting cavity 10;

Step S122: the light entering the light exporting cavity 10 being directed toward the surface of the bottom transmission layer 113 in contact with the light exporting cavity 10;

Step S123: the light a meeting the capturing condition being totally reflected at the surface of the bottom transmission layer 113 in contact with the light exporting cavity 10, and the light meeting the capturing condition being reflected by the bottom transmission layer 112 to the surface of the top transmission layer 111 in contact with the light exporting cavity 10, and being totally reflected at the surface of the top transmission layer 10 in contact with the light exporting cavity 10, to capture the light meeting the capturing condition;

the light b that does not meet the capturing condition passing through the bottom transmission layer toward the bottom reflection layer 112, and the bottom reflection layer 112 reflecting light that does not meet the capturing condition into light meeting the capturing condition, the light reflected to meet the capturing condition passing through the bottom transmission layer and entering the light exporting cavity 10 such that light that is reflected to meet the capturing condition is captured.

Figure 9:
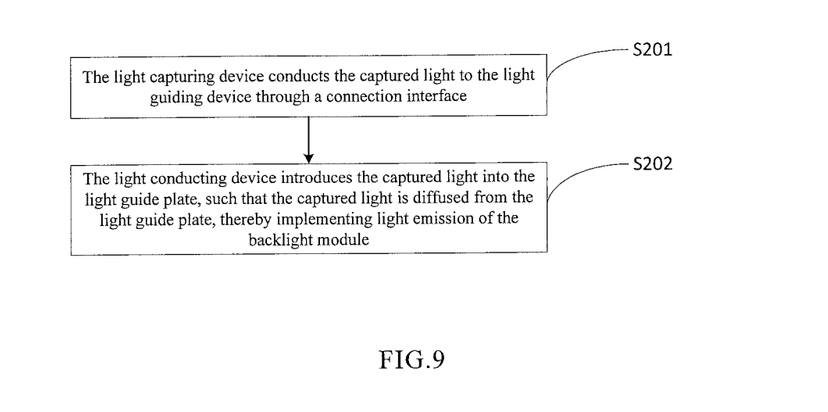
FIG. 9 is a flowchart of a method of introducing the captured light into the light guide plate in some embodiments of the present disclosure.

When the light collection component 1 further includes a light guiding device 12, the light entrance of the light guiding device 12 is connected to the connection opening 100, and the light exit of the light guiding device 12 is opposite to the light incident surface of the light guide plate 2. As shown in FIG. 1 to FIG. 4 and FIG. 9, the captured light being introduced into the light guide plate 2 at this time includes:

Step S201: the light capturing device 11 conducting the captured light to the light guiding device 12 through the connection interface 100;

Step S202: the light conducting device 12 introducing the captured light into the light guide plate 2, such that the captured light is diffused from the light guide plate 2, thereby implementing light emission of the backlight module.

A display device is further provided in some embodiments of the present disclosure, including the backlight module provided by the above embodiments.

Compared with the related art, the beneficial effects of the display device provided by some embodiments of the present disclosure are the same as those of the backlight module provided by the foregoing technical solution, and are not described herein.

The display device provided in the foregoing embodiments may be any product or component comprising a display function, such as a mobile phone, a tablet computer, a television, a display, a notebook computer, a digital photo frame, or a navigator.

Specifically, the display device provided by some embodiments of the present disclosure may be a general display device or a reflective display device. In particular, when the display device provided by some embodiments of the present disclosure is a reflective display device, when the light provided by the backlight module in the related art passes through the reflective display panel, the transmittance of the reflective display panel is relatively low, and light luminance loss is severe. Therefore, in the display device provided by the present disclosure, ambient light is used to enhance backlight luminance of the backlight module to compensate for luminance loss generated when the backlight passes through the reflective display module.

As shown in FIG. 1 to FIG. 4, the display device provided by some embodiments of the present disclosure further includes a display panel 5. The light collection component 1 in the backlight module is arranged at the periphery of the display panel 5. Thus, in the display device provided by some embodiments of the present disclosure, the portion between the display panel 5 and the bezel is fully utilized, and the light collection component 1 of the backlight module is placed therein to reduce the volume of the backlight module. Since the surface of the light capturing device 11 receiving light is in the same plane as the display surface of the display panel 5, the source of light captured by the light capturing device 11 is ensured.

The various position of the connection opening may be set according to actual conditions. For example, as shown in FIG. 1 to FIG. 4, the connection opening 100 is opposed to the bezel, and the end surface of the light capturing device away from the connection opening 100 is opposite to the side surface of the display panel 5.

In the description of the above embodiments, specific features, structures, materials or features may be combined in any suitable manner in any one or more embodiments or examples.

The above description pertains to only the specific embodiments of the present disclosure, but the scope of protection of the present disclosure is not limited thereto. Any person skilled in the art may easily think of changes or substitutions within the technical scope of the present disclosure, and the changes or substitutions should be covered within the scope of protection of the present disclosure. Therefore, the scope of protection of the present disclosure should be determined by the scope of protection of the claims.

What is claimed is:

1. A backlight module, comprising a light guide plate and a light collection component, wherein the light collection component comprises a light capturing device, the light capturing device comprises a connection opening, and the connection opening of the light capturing device is configured to introduce captured light into the light guide plate;
   wherein the light collection component further comprises a light conducting device, a light entrance of the light conducting device is connected to the connection opening, and a light exit of the light conducting device is connected to a light incident surface of the light guide plate;
   wherein an area of the light entrance of the light conducting device is greater than an area of the connection opening;
   wherein the light capturing device comprises a bottom reflection layer, a top transmission layer and an end reflection layer, a light exporting cavity is arranged between the top transmission layer and the bottom reflection layer, the connection opening is arranged at an end of the light exporting cavity, and the end reflection layer is arranged at an end of the light exporting cavity opposite to the connection opening;
   wherein the light capturing device further comprises a bottom transmission layer in contact with the light exporting cavity, the bottom reflection layer is oblique relative to the bottom transmission layer, wherein
   the bottom reflection layer comprises a first surface at a side of the bottom reflection layer adjacent to the bottom transmission layer, the first surface is a planar surface which is in connection with the end reflection layer and the bottom transmission layer and extends from the end reflection layer to the bottom transmission layer.

2. The backlight module according to claim 1, wherein the top transmission layer comprises a top optically thinner medium layer and a top optically denser medium layer arranged in a stacked manner, the top optically denser medium layer is arranged between the light exporting cavity and the top optically thinner medium layer, and the bottom reflection layer is parallel to the top optically denser medium layer.

3. The backlight module according to claim 1, wherein the bottom transmission layer is arranged between the top transmission layer and the bottom reflection layer.

4. The backlight module according to claim 3, wherein the bottom transmission layer is parallel to the top transmission layer, an angle between the bottom reflection layer and the bottom transmission layer is equal to a critical incident angle θ, and the critical incident angle θ is a minimum incident angle of light a meeting a capturing condition and emitted to the top transmission layer from the outside,
   the bottom reflection layer is configured to reflect light that does not meet the capturing condition into light meeting the capturing condition, to enable the light meeting the capturing condition to be captured by the light capturing device.

5. The backlight module according to claim 3, wherein the top transmission layer comprises a top optically thinner medium layer and a top optically denser medium layer, the bottom transmission layer comprises a bottom optically thinner medium layer and a bottom optically denser medium layer, the light exporting cavity is arranged between the top optically denser medium layer and the bottom optically denser medium layer, the top optically denser medium layer and the bottom optically denser medium layer are both in contact with the light exporting cavity, the top optically thinner medium layer is in contact with a surface of the top optically denser medium layer away from the light exporting cavity, and the bottom optically thinner medium layer is in contact with a surface of the bottom optically denser medium layer away from the light exporting cavity, and the bottom reflection layer is opposite to a surface of the bottom optically denser medium layer away from the bottom optically denser medium layer.

6. The backlight module according to claim 3, wherein the bottom transmission layer is configured to totally reflect light meeting the capturing condition on a surface of the bottom transmission layer in contact with the light exporting cavity, to reflect the light meeting the capturing condition to the surface of the top transmission layer in contact with the light exporting cavity and totally reflected the light on the surface of the top transmission layer in contact with the light exporting cavity, to capture the light meeting the capturing condition, and the bottom reflection layer is configured to reflect light that does not meet the capturing condition into light meeting the capturing condition and reflect the light meeting the capturing condition to the bottom transmission layer to enable the light to enter into the light exporting cavity.

7. The backlight module according to claim 1, wherein the bottom reflection layer is configured to reflect light entering the light exporting cavity to a surface of the top transmission layer in contact with the light exporting cavity, the top transmission layer is configured to totally reflect light meeting a capturing condition on the surface of the top transmission layer in contact with the light exporting cavity to capture the light meeting the capturing condition.

8. The backlight module according to claim 1, wherein the light conducting device is configured to introduce the captured light into the light guide plate, to diffuse the captured light through the light guide plate.

9. A display device, comprising a backlight module and a display panel, wherein the backlight module comprises a light guide plate and a light collection component, the light collection component comprises a light capturing device, the light capturing device comprises a connection opening, and the connection opening of the light capturing device is configured to introduce the captured light into the light guide plate, the light collection component of the backlight module is arranged at a periphery of the display panel, and a surface of the light capturing device receiving light and a display surface of the display panel are on the same plane;

wherein the light collection component further comprises a light conducting device, a light entrance of the light conducting device is connected to the connection opening, and a light exit of the light conducting device is connected to a light incident surface of the light guide plate;

wherein an area of the light entrance of the light conducting device is greater than an area of the connection opening;

wherein the light capturing device comprises a bottom reflection layer, a top transmission layer and an end reflection layer, a light exporting cavity is arranged between the top transmission layer and the bottom reflection layer, the connection opening is arranged at an end of the light exporting cavity, and the end reflection layer is arranged at an end of the light exporting cavity opposite to the connection opening;

wherein the light capturing device further comprises a bottom transmission layer in contact with the light exporting cavity, the bottom reflection layer is oblique relative to the bottom transmission layer, wherein the bottom reflection layer comprises a first surface at a side of the bottom reflection layer adjacent to the bottom transmission layer, the first surface is a planar surface which is in connection with the end reflection layer and the bottom transmission layer and extends from the end reflection layer to the bottom transmission layer.

* * * * *